Oct. 24, 1933.  M. HANSEN  1,931,653
TRACTOR GUIDE
Filed July 2, 1932  4 Sheets-Sheet 1

INVENTOR.
Merlin Hansen
BY Brown, Jackson
Boettcher & Dienner
ATTORNEYS.

Oct. 24, 1933.    M. HANSEN    1,931,653
TRACTOR GUIDE
Filed July 2, 1932    4 Sheets-Sheet 2
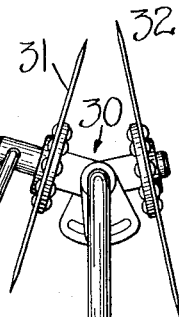
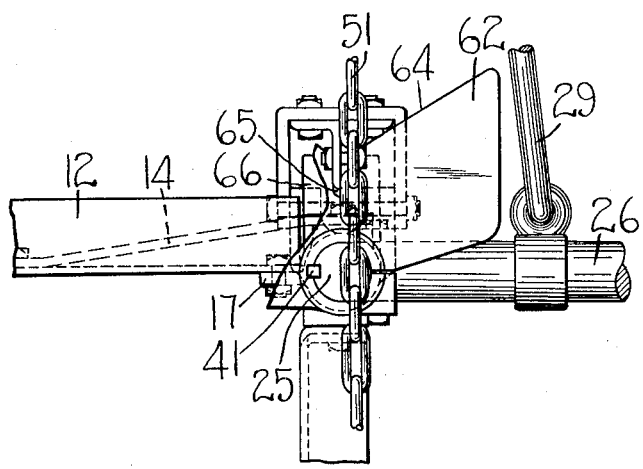
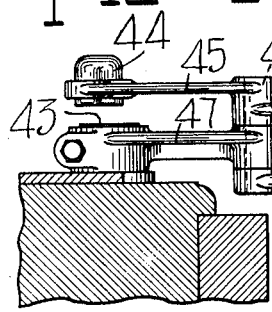
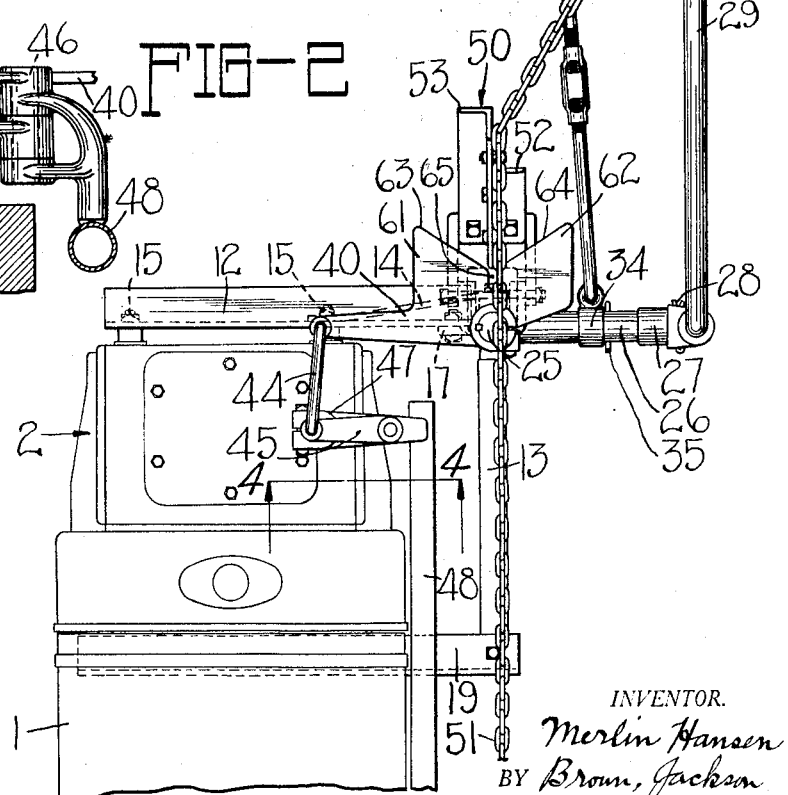
INVENTOR.
Merlin Hansen
BY Brown, Jackson
Boettcher & Dienner
ATTORNEYS.

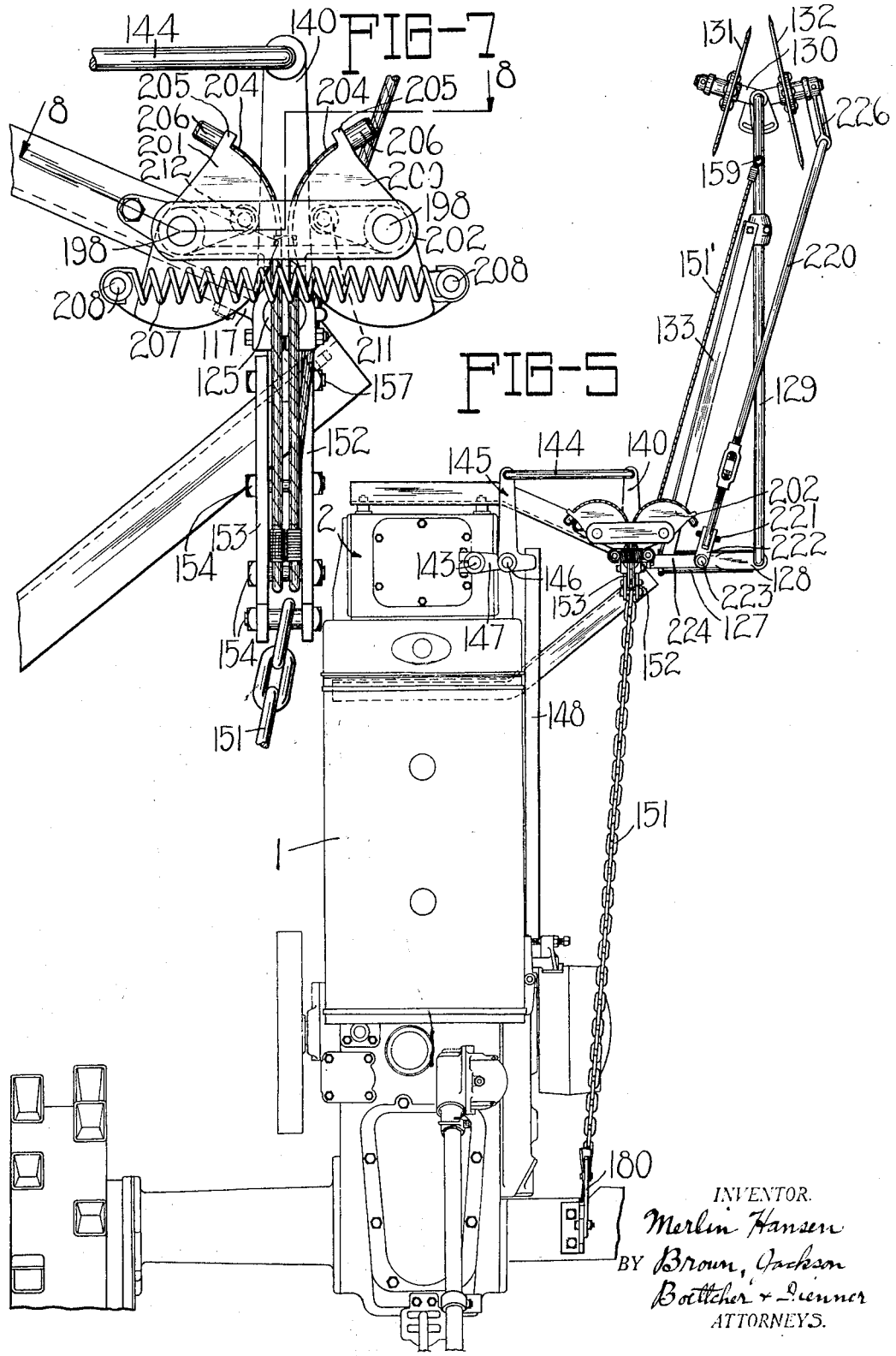
Oct. 24, 1933.  M. HANSEN  1,931,653
TRACTOR GUIDE
Filed July 2, 1932    4 Sheets-Sheet 3
INVENTOR.
Merlin Hansen
BY Brown, Jackson
Boettcher & Dienner
ATTORNEYS.

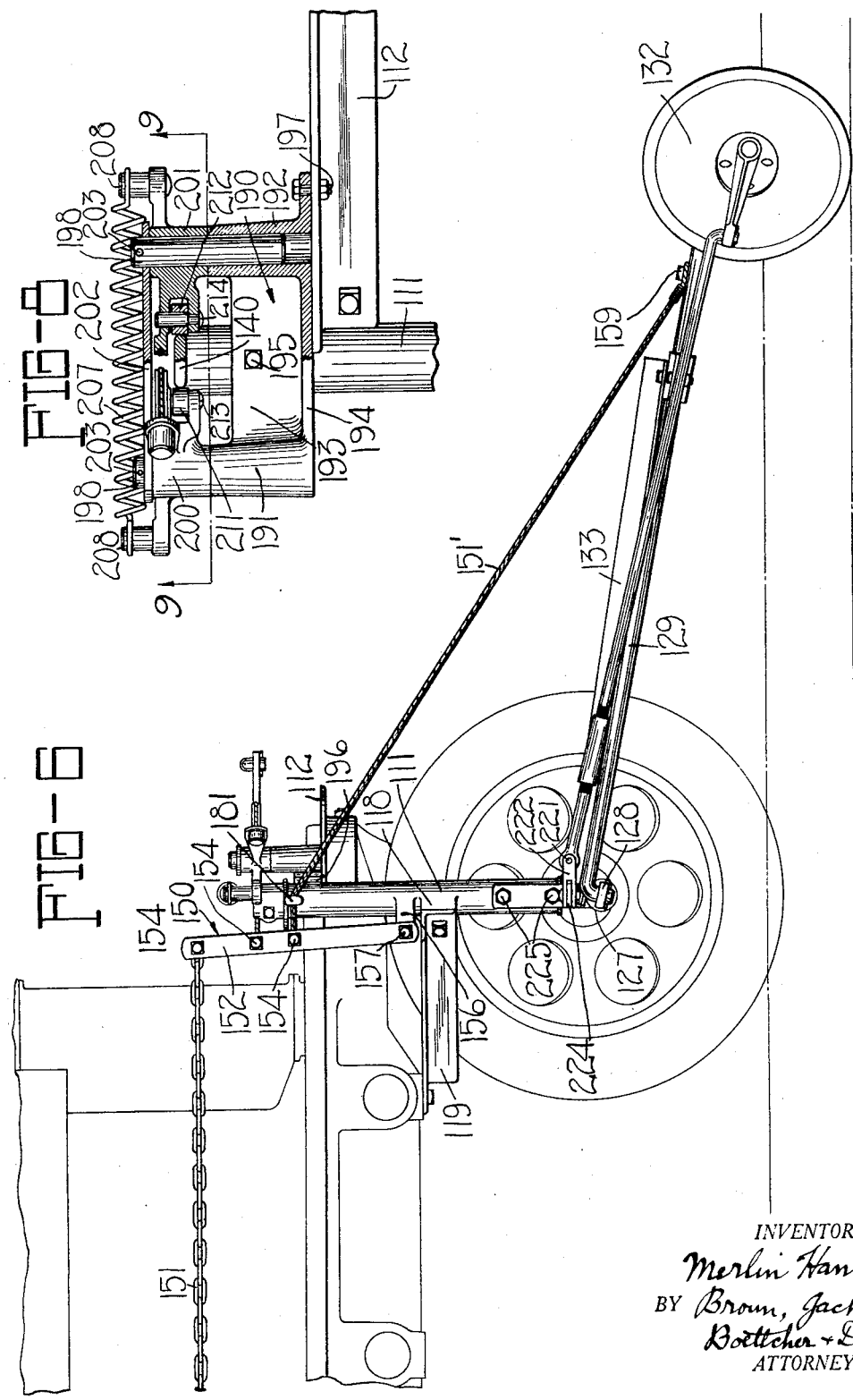

Patented Oct. 24, 1933

1,931,653

UNITED STATES PATENT OFFICE 1,931,653

TRACTOR GUIDE

Merlin Hansen, Waterloo, Iowa, assignor to John Deere Tractor Company, Waterloo, Iowa, a corporation of Iowa Application July 2, 1932. Serial No. 620,647

15 Claims. (Cl. 97—49)

The present invention relates generally to tractors and other vehicles and has for its principal purpose the provision of new and useful improvements in auxiliary steering devices adapted to be attached to a vehicle and to automatically steer the same by contact with the ground to maintain the vehicle on the desired line of travel.

Another object of the present invention is the provision of auxiliary steering means for vehicles and the like which is operatively associated with the manual steering means of the vehicle in such a manner that either of the steering means is capable of controlling the dirigible wheels of the vehicle, in connection with improved means for locking one of the steering means in inoperative position, whereby the other steering means may be utilized in controlling the dirigible wheels of the tractor without in any way disturbing the connections between the two steering means.

More specifically, the present invention contemplates the provision of an automatic steering device in the form of a tractor guide interconnected with the manual steering means of the tractor and adapted to maintain the tractor in a desired line of travel alongside a furrow or the like, which tractor guide is so constructed and arranged that it may be raised to inoperative position out of contact with the ground and to be locked in that position, whereby the manual means of the tractor is operative without further adjustment for steering the tractor.

Another object of the present invention is the provision of means for raising and lowering the tractor guide and means operating simultaneously therewith for shifting the tractor guide to the longitudinal position relative to the tractor and for holding the same in that position.

These and other objects of the present invention will be apparent to those skilled in the art after a consideration of the following detailed description of the structure in which the present invention is preferably embodied and which is illustrated in the accompanying drawings.

In the drawings:

Figure 2 is a top plan view of the construction illustrated in Figure 1 and showing the whole of the tractor guide, together with the means for raising and lowering the same;

Figure 3 is an enlarged fragmentary detail illustrating the mounting of the tractor guide on the tractor and a portion of the raising and lowering means;

Figure 4 is a fragmentary sectional view taken along the line 4—4 of Figure 2 and showing one form of differential lever means operatively connecting the manual steering means and the tractor guide with the steering arm of the dirigible wheels of the tractor;

Figure 5 is a top plan view showing a slightly modified form of tractor guide in which the ground engaging wheels of the tractor guide are steered differentially with respect to the dirigible wheels of the tractor;

Figure 6 is a side elevation of the structure shown in Figure 5;

Figure 7 is an enlarged fragmentary detail illustrating the means for returning the tractor guide to a longitudinal position with respect to the tractor when the guide is raised in its inoperative position out of contact with the ground;

Figure 8 is a detail view, partly in section and partly in elevation, corresponding to a view taken along the line 8—8 of Figure 7;

Figure 1:
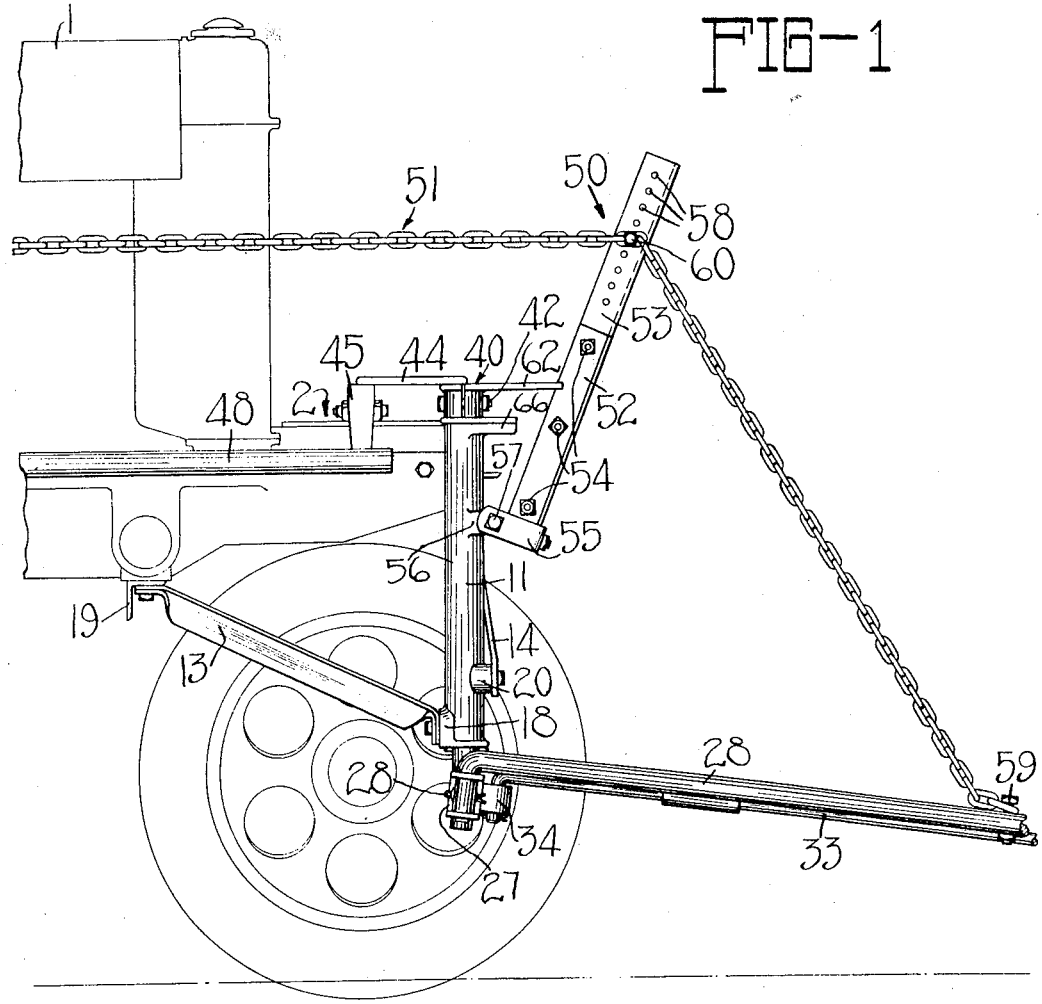
Figure 1 is a side view of the front end of a tractor and the rear portion of an associated tractor guide embodying the principles of the present invention.

Referring now to the drawings, it will be observed that the tractor guide of the present invention is illustrated as being applied to a wide tread tractor 1 having a front steering truck 2.

The guide of Figures 1 to 4 comprises a vertical sleeve 11 which is supported on the tractor near the front end and to one side thereof through connections including an angle iron 12 and braces 13 and 14. Angle iron 12 is bolted to the front of the tractor 1 by means of bolts 15 and is bolted to the lug 17 provided on the upper end of sleeve 11. Brace 13 is bolted to boss 18 formed on the lower end of sleeve 11, and at its other end is bolted to the end of an angle iron 19 bolted to the side of the tractor body. Brace 14 is bolted to a boss 20 formed on sleeve 11 near its lower end and is fixed to angle iron 12 by one of the bolts 15.

A spindle 25 is journaled within the sleeve 11 for movement about a substantially vertical axis.

The lower end of the spindle 25 is bent laterally, as shown at 26 in Figure 2, and a forked member 27 is journaled on the outer end of the portion 26 and is held therein by any suitable means, such as a cotter pin 28. In aligned openings in the arms of member 27 the bent end of a beam 29 is journaled. The forward end of beam 29 is also provided with a bent portion to form a vertical pivot upon which the casting 30 is pivotally mounted. Casting 30 carries the ground engaging guiding disks 31 and 32. Casting 30 is held in a fixed position of adjustment with respect to beam 29 by means of a brace rod 33 which is supported by a sleeve 34 journaled on member 26. Sleeve 34 is held in position on member 26 by means of cotter pin 35.

As the disks 31 and 32 follow lateral deviations of a furrow, spindle 25 is caused to rotate in sleeve 11. To the upper end of spindle 25 which extends above the upper end of sleeve 11, an arm 40 is fixed by means of a key 41 and a bolt 42, the hub of the arm being split on one side. Arm 40 extends towards the tractor to a point substantially in line with the regular steering spindle 43 of the tractor. The end of arm 40 is link connected by means of a link 44 to a lever 45 which is pivotally mounted by means of the pivot 46 to the end of the steering arm 47 fixed to the end of steering spindle 43. The opposite end of lever 45 has a ball formed thereon which is connected in the socket formed in the forward end of the regular steering rod 48. Inasmuch as the steering link 48 is normally locked against fore and aft movement by reason of its irreversible worm and worm gear connection with the steering wheel of the tractor, movements of arm 40 will be transmitted through lever 45 to spindle 43 causing the front wheel truck of the tractor to steer in response to the guiding movements of the disks 31 and 32.

The mechanism for raising the guide into an inoperative position, and at the same time lock it against rotation to place the steering of the front truck of the tractor under sole control of the regular steering wheel of the tractor, includes an arm 50 and chain 51. At its lower end arm 50 has a U-shaped member 55 fixed thereto which member embraces lugs 56 extending forwardly from and formed integral with sleeve 11, and is pivotally connected thereto by means of bolt 57.

Angle iron 53 extends beyond the end of member 52, this extended end being provided with a series of holes 58. Chain 51 is connected at one end to a bolt 59 fixed to beam 29 and at its other end is connected to a suitable raising and lowering lever provided at the rear of the tractor. Intermediate its ends, chain 51 is connected to a bolt 60 positioned in one of the holes 58. By actuating the lifting lever rearwardly, beam 29 with its brace 33 is rocked upwardly about member 26 to raise the guide to inoperative position, arm 50 rocking from the position shown in Figure 2 to a vertical position shown in Figure 3. Instead of being connected to the lifting lever the chain 51 may be connected to the usual power lift of a tractor, whereby the tractor guide will be raised and lowered by the power of the tractor. Also, a link or rod may be substituted for the chain 51.

Arm 40 has a pair of wings 61 and 62 formed integral therewith. These wings are provided with rearwardly converging edges 63 and 64 terminating in slot 64. When the guide is raised to inoperative position and arm 50 is raised into a vertical position, it is guided by means of the converging edges 63 and 64 into the slot 65. A pair of lugs 66 and 67, forming a slot between them, extend forwardly and are formed integral with the upper end of sleeve 11. When arm 50 is swung into its vertical position, its rear edge enters into the slot between these lugs. With arm 50 in the latter slot and in slot 65, arm 40 is locked against movement. With arm 40 locked against movement, fore and aft movement of the steering rod 48 through the actuation of the regular steering wheel reacts against the locked arm 40 and causes turning of the spindle 43.

The guide shown in Figures 5 to 10 comprises a sleeve 111 supported from the tractor to one side thereof by means of an angle member 112 and a brace member 119, the laterally extending ends thereof being toward each other and bolted to suitable lugs 117 and 118 formed integral with sleeve 111.

Within sleeve 111 a spindle 125 is journaled. Spindle 125 has a laterally bent portion at its lower end over which a sleeve 127 is journaled. Sleeve 127 has a perforated flattened portion 128 on its outer end in which perforation the bent portion of beam 129 is supported. A casting 130 is pivotally supported on its forward end on a downwardly bent forward end of beam 129. On casting 130 ground engaging guiding disks 131 and 132 are rotatably mounted. Beam 129 is braced by means of the brace 133 fixed to the beam 129 at its front end and to the inner end of sleeve 127 at its rear end. An arm 140 is fixed to the upper end of spindle 125 and projects forwardly therefrom. Arm 140 is link connected by means of link 144 to a forwardly extending arm or bell crank 145. Bell crank 145 is pivotally connected by pivot 146 to an arm 147 fixed to the steering spindle 143 of the tractor. The laterally extending arm of bell crank 145 is pivotally connected to the forward end of steering rod 148 of the tractor.

The means for raising the guide into an inoperative position comprises an arm 150, a chain 151 and a cable 151'. Arm 150 comprises a series of spaced bars 152 and 153 bolted together by means of bolts 154. At its lower end arm 150 is pivotally connected by means of a pivoting bolt 157 to a lug 156 formed integral with and extending rearwardly from sleeve 111. Chain 151 is connected at one end to the upper bolt 154 on arm 150, and at its rear end is connected to a raising and lowering lever 180 mounted on the rear end of the tractor. A cable 151' is connected at its forward end to a bolt 159 fixed to beam 129 and passes through an eye 181 formed integral with sleeve 111. Its lower end is connected to the lower bolt 154 of arm 150. Through the actuation of lever 180 beam 129 with its brace 133 fixed to sleeve 127 is rocked upwardly about the laterally extending lower end of spindle 125.

That portion of the modified form of guide just described is similar in its essentials to the corresponding parts of the previously described guide shown in Figures 1 to 4 and the corresponding parts have been given the same numerals with the hundred digit prefixed thereto. The two forms, however, differ essentially in the mechanism provided for locking the guide against movement when in raised position. This mechanism will now be described.

As best shown in Figure 8, a casting 190 comprising two upstanding bearing bosses 191 and 192 connected by means of webs 193 and 194 is fixedly mounted by means of a cap screw 195 to a boss 196 provided on the upper end of sleeve 111 and formed integral therewith, and by means of a bolt 197 to angle member 112. A shaft or stud 198 is journaled in the borings of each of the bearing bosses 191 and 192, and on these shafts a pair of arcuate members 200 and 201 are journaled. Above members 200 and 201, shafts 198 are connected together by means of a tie link 202, the latter being held in position by means of pins 203 passing through holes provided in the ends of shafts 198.

Arcuate members 200 and 201 are provided with semi-circular grooves in their edges to accommodate cables 204. The ends of these cables pass through perforations in lugs 205 and are anchored in blocks 206 which bear against the face of lugs 205. The other ends of the cables are connected to the middle bolt 154. By reason of this connection, whenever arm 150 is swung rearwardly in the lifting operation of the guide, arcuate members 200 and 201 are rotated to the position shown in Figure 7. When the guide is lowered, members 200 and 201 are rotated back to the position shown in Figure 5 through the agency of a tension spring 207, the ends of which are connected to lugs 208 provided on members 200 and 201.

Figure 9:
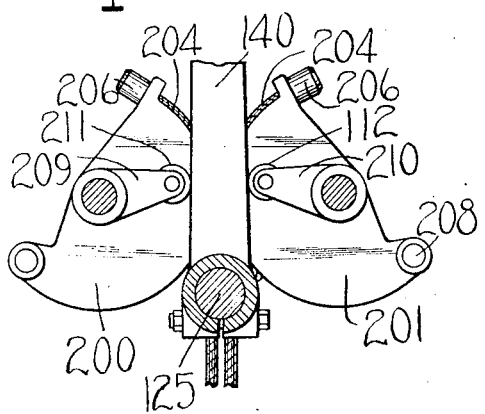
Figure 9 is a sectional view taken along the line 9—9 of Fig. 8.
Figure 10:
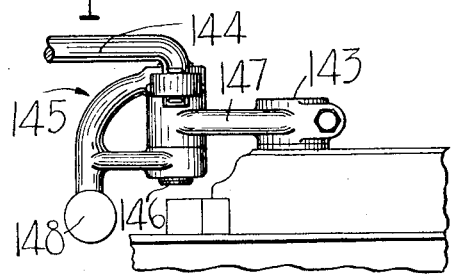
Figure 10 is a fragmentary elevation looking rearwardly of the tractor at the differential lever means operatively connecting the manual steering means and the tractor guide with the steering arm of the dirigible wheels of the tractor employed in this modification.

On the under side of the arcuate members 200 and 201 a pair of arms 209 and 210 are provided. Between these arms and the lower face of the arcuate members, rollers 211 and 212 are provided being journaled on pivot pins 213 and 214. Rollers 211 and 212 are disposed in the plane of arm 140 and are so positioned that when the members 200 and 201 are in the position representing the lifting position of the guide as is shown in Figures 7, 8 and 9, these rollers will bear against opposite sides of the arm 140 holding it in a longitudinal position, thereby locking it against rotation. If the guide is not in a straight forward position at the time it is lifted in which case arm 140 will be in angled position with respect to the longitudinal center line of the tractor, either one or the other of the rollers 211 and 212 will contact with the arm 140 and move it into the longitudinal position. The rollers therefore have the same function as the converging edges 63 and 64 of the arm member 40 shown in Figure 2. By virtue of the arms 209 and 210 and the rollers 211 and 212 the arm 140 and the forwardly extending beam member 129 are easily shifted to a position longitudinal with respect to the tractor 1.

In the modification shown in Figure 2, the casting 30 and the ground engaging guide wheels or disks 31 and 32 are maintained in substantially fixed position with respect to the forwardly extending member or beam 29 by virtue of the connection link 33. The construction shown in Figure 5, however, is such that the ground engaging guiding disks 131 and 132 are steered so that they are maintained in a position of substantial parallelism with respect to the longitudinal center line of the tractor. For this purpose the casting supporting the guiding disks, instead of being held in a fixed position with respect to the forwardly extending beam as is the casting 30, is pivotally mounted with its position relative to the beam 129, being controlled through link 220 which is connected by means of a horizontal pivot 221 to a bracket 222 which, in turn, is connected by means of a vertical pivot 223 to the end of an arm 224 fixed to the side of sleeve 111 at the lower end thereof by means of bolts 225. The forward end of link 220 is pivotally connected to a rearwardly extending arm 226 fixed to one of the arms of the casting 130 outside of disk 132. As the disks 131 and 132 follow the lateral deviations of a furrow, through the control of link 220, the disks bear against the side of the furrow wall sidewise rather than edgewise.

While I have shown and described in detail the structure in which the present invention is preferably embodied, it will be apparent to those skilled in the art that my invention is not to be limited to the specific structure shown and described, but that, in fact, widely different means may be employed in the practice of the broader aspects of my invention.

What I claim, therefore, and desire to secure by Letters Patent is:

1. The combination with a vehicle having dirigible wheel means and a shiftable member operatively associated therewith to steer the same, of a lever pivotally connected with said member, and two separate steering control means connected with said lever at spaced points thereon, each of said steering control means being adapted to react against the other and to swing said member to steer said dirigible wheel means.

2. The combination with a vehicle having dirigible wheel means and a shiftable member for steering said wheel means, a lever pivoted to said shiftable member, manual steering means including a link member connected with said pivoted lever, and a second steering means connected with said pivoted lever, both of said steering means being operable to shift said shiftable member to steer the wheel means by reacting against the other steering means.

3. The combination with a vehicle having dirigible wheel means and a shiftable member associated therewith to steer the same, a lever pivotally connected with said shiftable member, two separate steering control means for shifting said wheel means, and link means connecting each of said steering control means with said lever, each control means reacting against the other to steer the wheel means by swinging said lever about its connection with the link means of the inactive control means.

4. The combination with a vehicle having dirigible wheel means and a shiftable member for steering said wheel means, of a bell crank pivotally connected with said shiftable member, and a separate steering control means operatively associated with each of the arms of said bell crank, each steering control means reacting against the other to effect steering of said dirigible wheel means.

5. The combination with a vehicle having dirigible wheel means and a shiftable member arranged to steer said wheel means, of a member pivotally connected with said shiftable member, two separate steering means connected with said pivoted member, each means being operative to react against the other to shift said shiftable member to steer said dirigible wheel means, and means providing for the retention of each of said means to take the steering reaction of the other.

6. The combination with a vehicle having dirigible wheel means and a shiftable member movable to control said wheel means, of a lever pivotally connected with said shiftable member, manually operated steering mechanism associated with said lever and operative to rock the same to steer said wheel means, a second steering mechanism movable into and out of operative position and also connected with said pivoted lever for shifting said movable member to steer said wheel means, and means operative to raise said second steering means to inoperative position and to lock the same against the reaction developed by the other steering means in controlling said dirigible wheel means.

7. The combination with a vehicle having dirigible wheel means and a shiftable member associated therewith to steer said wheel means, of a lever pivotally connected with said shiftable member, manually controlled steering means operatively associated with one portion of said lever for rocking the same to shift said shiftable member, a second steering means connected with said pivoted lever at a point spaced from the connection of said first mentioned steering means and including a ground engaging element and a forwardly extending member supporting the same, means for raising and lowering said forwardly extending member and said ground engaging element, and means for locking said second steering means in inoperative position with said forwardly extending member disposed longitudinally of the vehicle.

8. The combination with a vehicle having dirigible wheel means, of steering means for controlling the position of said dirigible wheel means, said means comprising manually operated mechanism disposed on said vehicle, a forwardly extending member movably carried by the vehicle and including at its forward end ground engaging means, means connecting said manually operated mechanism with said forwardly extending member, said means being connected with said dirigible wheel means to place the latter under the control of both said manually operated mechanism and said forwardly extending member, means on the vehicle for raising and lowering said member, and means movable with said last named member and controlled by said raising and lowering means for shifting said member to a position longitudinal of the vehicle and holding the member in that position, whereby the manually controlled means on the vehicle is operative to steer said dirigible wheel means by reacting against said forwardly extending member.

9. The combination with a tractor having dirigible wheel means, of a steering device for controlling the position of said wheel means including a forwardly extending member connected with said dirigible wheel means and movable about a vertical axis for steering said wheel means, said member being also movable about a horizontal axis for movement into and out of operative position, means for raising said member to inoperative position including a shiftable member movably mounted on the tractor, and means movable with said forwardly extending member about its vertical axis and engageable by said shiftable member for causing the forwardly extending member to be swung to a position longitudinal with respect to the tractor when said member is raised to its inoperative position.

10. The combination with a tractor having dirigible wheel means, of a tractor guide including a vertically shiftable ground engaging member swingable about a vertical axis for shifting said wheel means, a member movable with said forwardly extending member and provided with forwardly diverging arms, and means for raising said forwardly extending member to inoperative position including a member movably mounted on the tractor and shiftable in the raising operation to a position between said forwardly diverging arms to engage the latter, whereby the forwardly extending member is swung to a position longitudinal with respect to the tractor when said member is raised to its inoperative position.

11. The combination with a tractor having dirigible wheel means, of a tractor guide comprising a forwardly extending ground engaging member operatively connected to steer said wheel means and movable into and out of operative position, means for raising said member to inoperative position, and means acting simultaneously therewith and carried by the tractor independently of said member for shifting the latter to a position longitudinally of the tractor when said member is raised to its inoperative position.

12. The combination with a tractor having dirigible wheel means, of a tractor guide including a forwardly extending member movably mounted on the tractor for movement about a vertical axis, an arm movable with said member and operatively connected with said wheel means to steer the same, means for raising said ground engaging member to inoperative position, and means movably mounted on the tractor and adapted to engage said arm for shifting said ground engaging member to a position longitudinally of the tractor when said member is raised to its inoperative position.

13. The combination with a tractor having dirigible wheel means, of a tractor guide including a forwardly extending ground engaging member mounted on the tractor for movement about a horizontal and a vertical axis, an arm connected with said ground engaging member and movable therewith about its vertical axis, means connected with said arm for steering said wheel means by said ground engaging member, means for raising said member to inoperative position, a pair of oppositely acting arms mounted on the tractor and movable into engagement with said first mentioned arm at opposite sides thereof to shift said first arm and said ground engaging member to a position longitudinal with respect to the tractor, and means for swinging said oppositely acting arms simultaneously with the operation of said raising means.

14. The combination with a tractor having dirigible wheel means, of a tractor guide including a forwardly extending ground engaging member movably mounted on the tractor for movement about a vertical and a horizontal axis, an arm connected to move with said ground engaging member about its vertical axis, means for raising said ground engaging member to inoperative position, means connecting said ground engaging member with said dirigible wheel means to steer the latter, and means carried by the tractor and shiftable into engagement with said arm from either side thereof for shifting the latter and said ground engaging member to a position longitudinal with respect to the tractor and holding the same in that position, said last named means being operated simultaneously with said raising means.

15. The combination with a vehicle having dirigible wheel means and a shiftable member positively associated therewith to steer the same, of a lever pivotally connected with said member, two separate steering control means connected with said lever at spaced points thereon, each of said steering control means being adapted to react against the other and to swing said member to steer said dirigible wheel means and one of said steering control means including a forwardly extending member associated with said lever and ground engaging means disposed at the forward end of said member and movable into and out of operative ground-engaging position, means for raising said member to inoperative position, and means acting simultaneously therewith for shifting said member to a position longitudinally of the tractor when said member is raised to inoperative position.

MERLIN HANSEN.